United States Patent
Lee et al.

(10) Patent No.: US 9,280,846 B2
(45) Date of Patent: Mar. 8, 2016

(54) METHOD, APPARATUS, AND COMPUTER-READABLE RECORDING MEDIUM FOR DEPTH WARPING BASED OCCLUSION CULLING

(71) Applicants: Center Of Human-Centered Interaction For Coexistence, Seoul (KR); Research & Business Foundation Sungkyunkwan University, Gyeonggi-do (KR)

(72) Inventors: Sung Kil Lee, Gyeonggi-do (KR); Young Uk Kim, Gyeonggi-do (KR)

(73) Assignees: Center Of Human-Centered Interaction For Coexistence, Seoul (KR); Research & Business Foundation Sungkyunkwan University, Gyeonggi-do (KR)

( * ) Notice: Subject to any disclaimer, the term of this patent is extended or adjusted under 35 U.S.C. 154(b) by 0 days.

(21) Appl. No.: 14/790,431

(22) Filed: Jul. 2, 2015

(65) Prior Publication Data

US 2016/0005216 A1    Jan. 7, 2016

(30) Foreign Application Priority Data

Jul. 3, 2014    (KR) .................. 10-2014-0083129

(51) Int. Cl.
*G06T 15/40*    (2011.01)
*G06T 1/20*     (2006.01)

(52) U.S. Cl.
CPC ............. *G06T 15/405* (2013.01); *G06T 1/20* (2013.01); *G06T 2200/28* (2013.01)

(58) Field of Classification Search
None
See application file for complete search history.

(56) References Cited

U.S. PATENT DOCUMENTS

| 7,508,390 | B1* | 3/2009 | Demers ................. G06T 15/04 345/422 |
| 2004/0095999 | A1* | 5/2004 | Piehl ..................... H04N 19/51 375/240.16 |
| 2008/0225048 | A1* | 9/2008 | Bijankumar ............ G06T 15/40 345/421 |
| 2014/0028703 | A1* | 1/2014 | Pajak ..................... H04N 19/46 345/619 |
| 2014/0168362 | A1* | 6/2014 | Hannuksela ........ H04N 13/0048 348/43 |

FOREIGN PATENT DOCUMENTS

KR    10-2012-0087084    8/2012

\* cited by examiner

*Primary Examiner* — Andrew G Yang
(74) *Attorney, Agent, or Firm* — Husch Blackwell LLP

(57) ABSTRACT

A method for performing occlusion queries is disclosed. The method includes steps of: (a) a graphics processing unit (GPU) using a first depth buffer of a first frame to thereby predict a second depth buffer of a second frame; and (b) the GPU performing occlusion queries for the second frame by using the predicted second depth buffer, wherein the first frame is a frame predating the second frame. In accordance with the present invention, a configuration for classifying the objects into the occluders and the occludees is not required and the occlusion queries for the predicted second frame are acquired in advance at the last of the first frame or the first of the second frame.

15 Claims, 5 Drawing Sheets

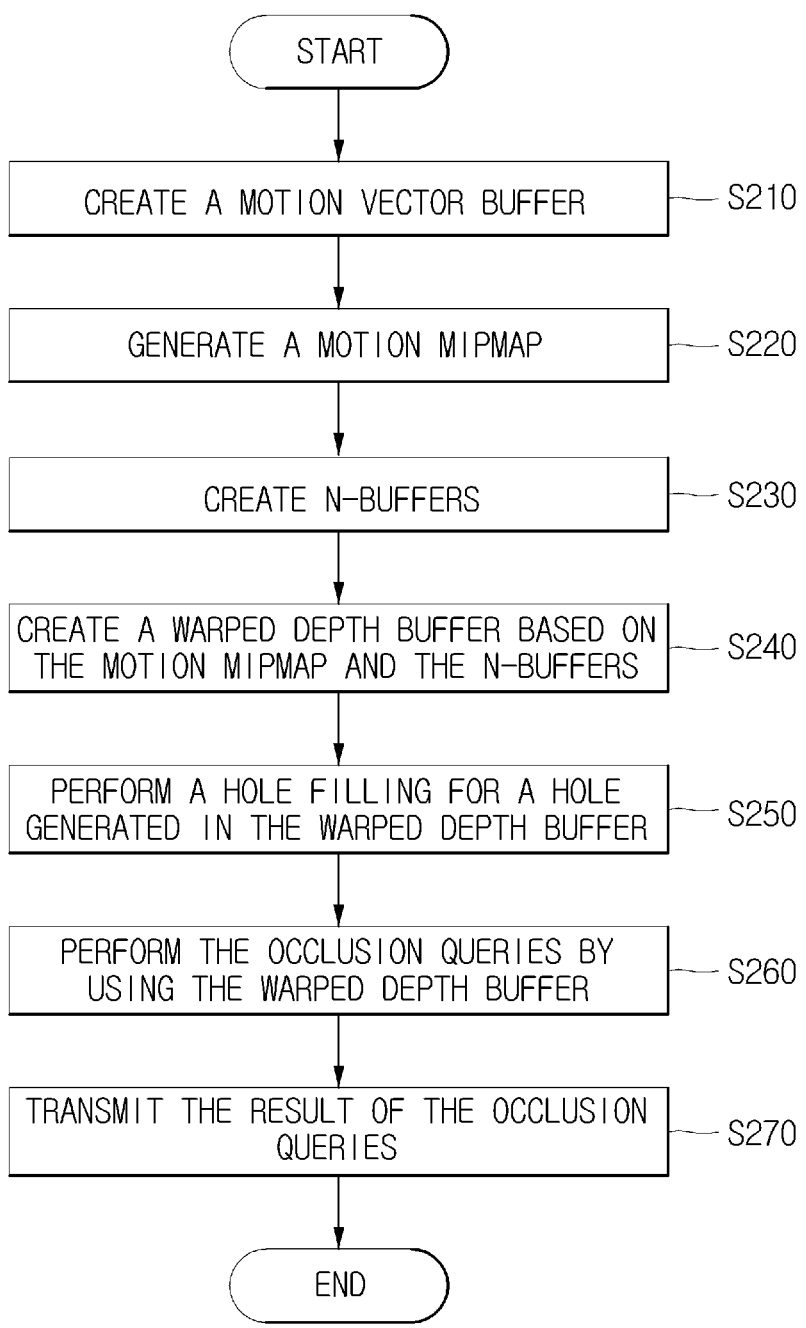

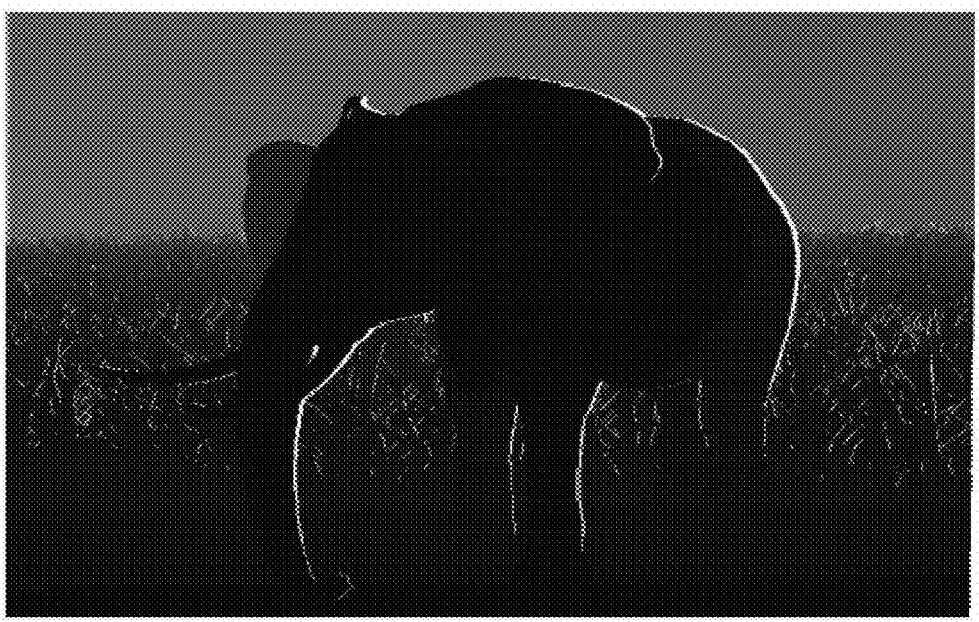

METHOD, APPARATUS, AND COMPUTER-READABLE RECORDING MEDIUM FOR DEPTH WARPING BASED OCCLUSION CULLING

CROSS REFERENCE TO RELATED APPLICATION

This application claims priority to and incorporates herein by reference all disclosure in Korean Patent Application No. 10-2014-0083129 filed Jul. 3, 2014.

FIELD OF THE INVENTION

The present invention relates to a method, an apparatus, and a computer-readable recording medium for removing frame occlusion; and more particularly, to the method, the apparatus, and the computer-readable recording medium for conservatively predicting a depth buffer of a next frame based on that of a current frame, and performing occlusion queries for the next frame by using the predicted depth buffer of the next frame.

BACKGROUND OF THE INVENTION

Rendering process as a computer graphics may simulate interactions among all objects existing in a scene. However, the performance of the rendering process may be apparently improved by omitting the simulation of invisible objects because all objects may not be seen on a screen.

A technique of determining whether to render an object by predicting the visibility of the object before the rendering process is called culling or occlusion culling. In other words, culling is a technique of determining an invisible object concealed by other objects.

Culling may include view frustum culling (VFC), occlusion culling (OC) and the like.

While the VFC is a technique of omitting the rendering of objects outside a virtual camera's current angle of view, the OC is a technique of omitting the rendering of objects that are hidden, i.e., occluded, by other objects within an angle of view.

The VFC has been used in a lot of rendering engines and software because it can determine whether to render an object by only referring to the location of the object, i.e., inside or outside a view frustum.

Contrarily, the OC can determine whether to render an object by referring to information on whether the object is occluded by other object(s) or not. To determine whether it is occluded or not, relatively complicated calculations may be required. Such additional calculations may cause excessive load and therefore, the OC is difficult to be added to existing rendering engines and software. Accordingly, the OC is generally applied partly to the rendering engines and the software.

The basic process of the OC is as shown below. First, the OC classifies objects into occluders that may conceal other objects and occludees that may be concealed by other objects. Next, the OC renders the occluders, and then creates depth buffers of the rendered occluders. After that, the OC renders or projects bounding objects (e.g., bounding box, bounding sphere, etc.) as geometric objects that entirely cover the occludees. Then, when all depths within image areas of the rendered or projected bounding objects are far from those of the occluders, the OC determines that the occludees are occluded. The concept as explained above is commonly applied to most OC techniques.

Depending on methods of determining whether to occlude occludees, the OC, furthermore, may be classified into two kinds of methods as explained below.

The first method as a traditional method is a technique of creating and using a hierarchical occlusion map. It is a method for configuring a depth buffer for occluders only hierarchically by using, e.g., mipmap or N-buffers, and comparing information on depths in the depth buffer configured hierarchically with depths of bounding objects of occludees. However, this cannot be widely used because it has problems such as load caused by creating the hierarchical structure, load caused by calculations to determine whether objects are occluded or not, or failure in bringing the result after an occlusion test effectively to a memory of a central processing unit (CPU).

The second technique is a method for determining visibility by using hardware occlusion queries (HOQs) recently provided by graphics hardware. Under the method, the graphics hardware renders occludees and counts the number of pixels closer than the depth buffer of occluders without any hierarchical structure among the pixels of the rendered occludees. When there is no pixel closer than the depth buffer of the occluders, the graphics hardware determines that the occludees have been entirely occluded and returns the result of the determination. To prevent corresponding objects from being drawn during the rendering process, the result of the determination must be transmitted to the CPU. However, each HOQ is performed in a unit of one object and considerable load is required to transmit the result of the determination in the unit of one object. Accordingly, it is not easy to improve the performance of rendering even by using HOQs and therefore, the HOQs are not easy to use commonly.

As advanced techniques of improving HOQs, there are coherent hierarchical culling (CHC) and CHC++ as a more improved technique than the CHC. The CHC++ does not immediately transmit the result of occludees to the CPU from a graphic processing unit (GPU) and delays the transmission until the next frame is processed. In addition, the CHC++ reduces load by transmitting only objects required for a scenegraph. However, even in the CHC++ process, if there are multiple objects, there are problems such as load of transmission and load of determining whether the objects are occluded. Because the CHC should process rendering and culling simultaneously, the CHC is not suitable for the existing rendering engines and software in which rendering is performed separately after culling is performed for all objects. Accordingly, the CHC is difficult to be used practically and also to be applied to multi-GPU rendering.

Therefore, the present inventor came to develop occlusion culling technology which can be easily applied to the existing rendering engines or software while reducing the load of determining whether to occlude.

SUMMARY OF THE INVENTION

It is an object of the present invention to solve all the aforementioned problems.

It is another object of the present invention to improve the accuracy of occlusion culling while reducing load of calculations and transmissions required for occlusion culling contrary to existing methods.

In particular, the present invention has three following important differences as improvements:

Firstly, the present invention may replace a process of selecting occluders required for occlusion queries with a process of conservatively predicting a depth buffer to be used for a next frame. According to this method, optimized occluders can be selected while difficulties in selecting the occluders are reduced. Accordingly, this method does not generate the load of additional calculations required for selecting the occluders while improving the accuracy of the occlusion queries.

Secondly, the present invention may predict a depth buffer of a next frame by performing warping of a depth buffer of a current frame as a result of rendering the current frame in use of the depth buffer of the current frame and motion vectors. This method can perform occlusion queries for the next frame in advance because it allows the result of the rendering of the next frame to be acquired in advance. As the occlusion queries are performed in advance and their result is transmitted immediately to the CPU, the load due to the transmission time from the GPU to the CPU can be apparently reduced.

Thirdly, the present invention may allow the occlusion queries for the objects of a frame to be post-processed in parallel by using a hierarchical occlusion map based on a hierarchical structure. Contrary to HOQs, this method may completely separate a process of culling and a process of rendering. This method may be easily integrated with the existing rendering software and it may be expanded easily to multi-GPUs.

In accordance with one aspect of the present invention, there is provided a method for performing occlusion queries, including steps of: (a) a graphics processing unit (GPU) using a first depth buffer of a first frame to thereby predict a second depth buffer of a second frame; and (b) the GPU performing occlusion queries for the second frame by using the predicted second depth buffer, wherein the first frame is a frame predating the second frame.

In accordance with another aspect of the present invention, there is provided a GPU, including: a depth buffer rendering unit for using a first depth buffer of a first frame to thereby predict a second buffer of a second frame; and an occlusion query unit for performing occlusion queries for the second frame by using the predicted second depth buffer; wherein the first frame is a frame predating the second frame.

BRIEF DESCRIPTION OF THE DRAWINGS

The above and other objects and features of the present invention will become apparent from the following description of preferred embodiments given in conjunction with the accompanying drawings, in which:

FIG. 2 is a flowchart of a method for performing occlusion queries in accordance with one example embodiment of the present invention.

FIGS. 3A to 3C show an RGB image of a current frame, a depth buffer of the current frame, and a predicted depth buffer of the next frame, respectively, in accordance with one example embodiment of the present invention.

DETAILED DESCRIPTION OF THE PREFERRED EMBODIMENTS

Figure 1:
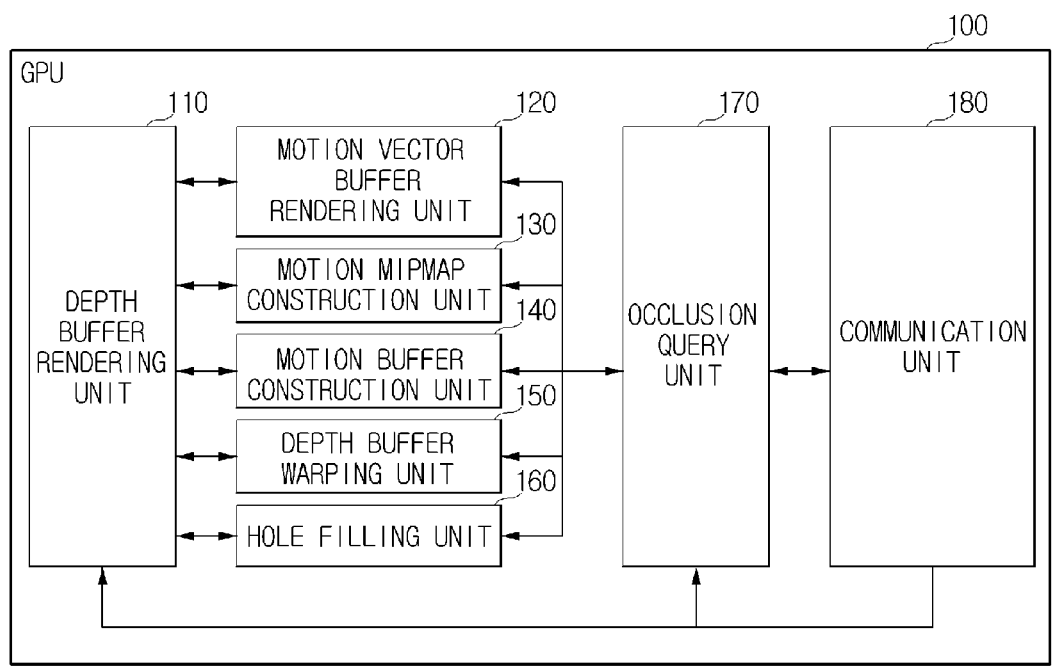
FIG. 1 is a drawing illustrating a configuration of a GPU that predicts a frame of a next frame in accordance with the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

Configuration of CPU

FIG. 1 is a drawing illustrating a configuration of a GPU 100 that predicts a frame of a next frame in accordance with the present invention.

In accordance with one example embodiment of the present invention, the GPU 100 may be a component that is in charge of computer graphics on a computer system. In the present invention, the GPU 100, however, may not be limited to the component in charge of computer graphics but may also mean a component, an independent apparatus, or a part of the independent apparatus, capable of performing a graphics-related process.

As illustrated in FIG. 1, the GPU 100 may include a depth buffer rendering unit 110, a motion vector buffer rendering unit 120, a motion mipmap construction unit 130, a motion buffer construction unit 140, a depth buffer warping unit 150, a hole filling unit 160, an occlusion query unit 170, and a communication unit 180.

In accordance with one example embodiment of the present invention, at least some of the depth buffer rendering unit 110, the motion vector buffer rendering unit 120, the motion mipmap construction unit 130, the motion buffer construction unit 140, the depth buffer warping unit 150, the hole filling unit 160, the occlusion query unit 170, and the communication unit 180 may be program modules. Such program modules may be included in the GPU 100 in a form of an operating system, an application program module, other program modules, and firmware or physically stored in various storage devices well known to those skilled in the art. In addition, at least some of such program modules may be stored in a remote storage device capable of communicating with the GPU 100. Herein, communication may be with any other external device through a network or inside a computer system through a bus. The program modules may include but not be subject to a routine, a subroutine, a program, an object, a component, and a data structure for executing a specific operation or a type of specific abstract data that will be described later in accordance with the present invention.

In accordance with one example embodiment of the present invention, the GPU 100, first of all, may create multiple frames consecutively in time. Herein, the GPU 100 may predict a depth buffer of a next frame by using a depth buffer of a current frame, and perform occlusion queries for the next frame by using the predicted depth buffer of the next frame. If the current frame is at a time t, the next frame may be at a time t+1.

In accordance with one example embodiment of the present invention, a depth buffer may include information on depths of pixels of a frame (or values which indicate the depths). Pixels may be placed two-dimensionally, and pixels and depths corresponding to them may also have two-dimensional coordinates.

In accordance with one example embodiment of the present invention, the GPU 100 may conservatively predict a depth buffer of a next frame by warping a depth buffer for all visible objects in a current frame to improve the performance of occlusion culling, and then use the predicted depth buffer of the next frame as occluders of the next frame. The objects shown in the current frame may be optimal occluders when they move to visible positions in the next frame. Accordingly, a process of selecting the occluders among the objects in the next frame may be removed in one example embodiment of the present invention. Herein, the meaning of "the depth buffer of the next frame is conservatively predicted" is that depths of the predicted depth buffer of the next frame is same as, or farther than, those of a true depth buffer of the next frame. As a result, if the conservatively predicted depth buffer of the next frame is used, a degree of accuracy in the occlusion culling may be somewhat degraded but error can be avoided effectively.

In accordance with one example embodiment of the present invention, the occlusion queries may be performed by using a hierarchical occlusion map. For example, the occlusion queries may use N-buffers for hierarchical structuralization of the depth buffer.

Functions of Components

The functions of components of the GPU 100 as shown below will be explained in accordance with one example embodiment of the present invention.

In accordance with one example embodiment of the present invention, the depth buffer rendering unit 110 may create a depth buffer for a frame.

To perform occlusion culling, a depth buffer where information on depths will be stored is required to render one or more objects in a frame. Herein, the information on the depths may be depths of pixels in the frame. The depth buffer may include the depths of pixels in the frame.

According to a general rendering process, only colors (e.g., Red, Green and Blue (RGB)) of fragments (or pixels) as a result of simulation between light and objects are required but the depths of the fragments are not positively necessary. However, particularly in case of real time rendering, the depth buffer may be used to maintain only fragments located further front. The GPU 100 may receive the depth buffer from outside or output the depth buffer to the outside. Accordingly, creating (or predicting) and processing the depth buffer for a frame as mentioned above may require no or only slight additional configurations or loads compared to normal graphic processing units. Besides, the depth buffer may be basically outputted for deferred shading in the real time rendering.

In accordance with one example embodiment of the present invention, the motion vector buffer rendering unit 120 may create a motion vector buffer.

To perform warping of the depth buffer, calculations of motion vectors that represent motions of one or more objects in a frame are required, and then a process of moving the one or more objects according to the calculated motion vectors, i.e., warping process, is required. A motion vector buffer may include the motion vectors in such a frame.

The motion vector buffer rendering unit 120 may store motions of a camera with respect to one or more objects by frame, and acquire the motion vectors by using a mathematical model that predicts the motion vectors linearly or non-linearly in use of the motions stored by frame. The motion vectors may show a distance and a direction where the pixels of the frame move.

In accordance with one example embodiment of the present invention, the motion vector buffer rendering unit 120 may acquire the motion vectors on a screen space and acquire the motion vectors on an object space. Additionally, the motion vector buffer rendering unit 120 may acquire the motion vectors according to a variety of methods not limited to the screen space and the object space.

In accordance with one example embodiment of the present invention, if the motion vectors on the screen space are acquired, the motion vector buffer rendering unit 120 may calculate the motion vectors of the respective pixels on the screen by using camera views and projection matrices in a previous frame and the current frame, respectively.

In the deferred shading, the motion vectors may be outputted to simulate motion blur effects. Accordingly, the creation and handling of the aforementioned motion vector buffer may require no or only slight additional configuration compared to the normal graphics processing unit.

In accordance with one example embodiment of the present invention, the motion mipmap construction unit 130 may generate a motion mipmap for a frame.

A motion mipmap may be an image reduced by 1/n by using the maximum and the minimum values of the motion vectors. For example, n may be 4. If the motion mipmap is created, a size of the motion vector buffer may be reduced by 1/n. In other words, image resolution may be reduced by 1/n by the motion mipmap. The motion vectors on the screen space may be two-dimensional.

In accordance with one example embodiment of the present invention, the motion mipmap construction unit 130 may create the motion mipmap by using the motion vector buffer. Whenever the size of the motion vector buffer is reduced by 1/n, the motion mipmap construction unit 130 may detect minimum and maximum values of n pixels, and reduce the n pixels into a 1*1 pixel by using the detected minimum value and the detected maximum value. The n pixels may be pixels in a square.

In accordance with one example embodiment of the present invention, to detect a plurality of pixels around one pixel of a frame according to a backward mapping method to be explained below, the created mipmap may be used to determine at least one maximum value for defining a scope where the detection is performed.

In accordance with one example embodiment of the present invention, the mipmap may show minimum and maximum values of global motions. Compared to the minimum and the maximum values of the global motions, N-buffers of the motion vectors to be explained below may be locally detected by locally reducing the scope of the motions.

In accordance with one example embodiment of the present invention, the motion buffer construction unit 140 may create the N-buffers of motions by using the motion vector buffer. The N-buffers may show images in a hierarchical structure for the motion vectors.

Contrary to the mipmap, the N-buffers keep the resolution of the motion vectors without reducing the resolution (or size) of images in the hierarchical structure by 1/n. Because they keep the resolution as it is, a cost of creating the N-buffers may be generally higher than that of generating the mipmap. However, in general, the N-buffers may produce the more accurate result with respect to the queries for detecting the minimum and the maximum values in a local area, compared to the mipmap.

In accordance with one example embodiment of the present invention, the depth buffer warping unit 150 may perform warping of the depth buffer.

In accordance with one example embodiment of the present invention, the depth buffer warping unit 150 may use a backward warping to perform the warping of the depth buffer. While a forward warping is a method for moving a pixel according to corresponding motion vector, the backward warping may be a method for finding a base pixel in a first frame to be moved to a pixel in a second frame through the warping process. The backward warping method may improve the performance of warping compared to the forward warping method, but to detect the base pixel, it requires a search scope to be reduced to a local scope.

According to the backward warping method, the depth buffer warping unit 150 may select respective base pixels to be moved to respective pixels of the depth buffer through the warping process. In other words, the depth buffer warping unit 150 may select pixels of the depth buffer in a certain order as current pixels and then select the base pixels to be warped to the current pixels. In one example embodiment of the present invention, the depth buffer warping unit 150 may detect motions which may be applied to the warping process around the current pixels by using the mipmap with respect to motions of all motion vectors to reduce the search scope and N-buffers with respect to local adjustment of the search scope.

By using the mipmap and the N-buffers, the depth buffer warping unit 150 may detect a maximum scope including pixel candidates that are possible to move from corresponding locations of the pixel candidates around a current pixel to the current pixel through corresponding motions. Herein, the scope may mean an area of pixel candidates within a specific distance from the current pixel or an area in a specified shape such as circular or tetragonal shape.

First of all, the depth buffer warping unit 150 may detect a first maximum value and a first minimum value of global motions to reach the current pixel by using the mipmap, and then detect a second maximum value and a second minimum value by using N-buffers within the area of a screen corresponding to the first maximum value and the first minimum value. The depth buffer warping unit 150 may detect an area of an image which tightly encloses the detected second maximum value and the detected second minimum value.

After the image area is detected, the depth buffer warping unit 150 may use fixed-point iteration to perform the warping of the depth buffer.

The result of the iteration may be different depending on initial values of iteration. The depth buffer warping unit 150 may increase a possibility of success in warping by using multiple initial values selected at random. Among pixels of the detected image area, the depth buffer warping unit 150 may detect one or more pixel candidates to which the distances from the current pixel are same as the corresponding motion vectors. Then, the depth buffer warping unit 150 may select a pixel with the lowest depth among the detected pixel candidates as a pixel to be warped to the current pixel.

In accordance with one example embodiment of the present invention, the hole filling unit 160 may fill a hole in the depth buffer. After warping is performed, there may be holes in the depth buffer. Holes may be pixels whose depths are not determined. Filling a hole may mean deciding the depth of the hole according to a procedure.

If there is no pixel moving to a position of a particular pixel by warping among pixels around the particular pixel, the particular pixel may be a hole. Because the depth buffer may not preserve an original depth of a pixel when warping for the pixel is performed, it may be, in general, difficult to decide the accurate depth of a hole.

In one example embodiment of the present invention, the hole filling unit 160 may use a variety of existing hole filling methods. For example, as effective approximation, the hole filling unit 160 may determine the depth of the hole by referring to one or more depths of one or more pixels around the hole. In other words, the hole filling unit 160 may use the depths of the pixels around the hole to fill the hole. A method for using the depths of the pixels around the hole is one of the best approximation method, but it cannot be made sure that the filled depth is accurate. For warping of colors of a frame, an error in the hole filling process may be a big problem. However, in one example embodiment of the present invention, it may be appropriate to conservatively respond to the problem of the error in the hole filling process, if possible, because the depth buffer is warped for the occlusion queries. For example, as a conservative action, the hole filling unit 160 may fill the hole with the maximum available depth. In other words, on assumption of worst cases that may occur upon hole filing, the hole filling unit 160 may prevent the occlusion queries using the depth buffer whose holes have been filled from producing a wrong result as much as possible.

In one example embodiment of the present invention, the occlusion query unit 170 may perform occlusion culling by using the warped depth buffer.

The occlusion query unit 170 may create hierarchical depth buffer by using the warped depth buffer and perform the occlusion culling by using the hierarchical depth buffer. The occlusion query unit 170 may use the N-buffers as the hierarchical depth buffer. In one example embodiment of the present invention, the N-buffers may be used in the hierarchical structure of the depth buffer and also in that of the motion vectors.

In one example embodiment of the present invention, the occlusion query unit 170 may create screen coordinates of one or more individual objects in a frame by applying world transformation, camera transformation, and projection transformation to the objects sequentially in use of the depth buffer with the hierarchical structure.

As a bounding box of an object is expressed with eight vertices, the occlusion query unit 170 may acquire an area of a square on a screen where the object is completely included by calculating the coordinates of the largest screen and the smallest one of the individual vertices of the bounding box. The occlusion query unit 170 may acquire the maximum values of the N-buffers for the acquired square area. The occlusion query unit 170 may determine that the object has been occluded if the lowest depth in the object is larger than the maximum value detected from the N-buffers. As explained above, the occlusion query unit 170 may perform images-based occlusion queries by using the depth buffer.

In one example embodiment of the present invention, the occlusion query unit 170 may perform the occlusion queries by fragmenting the bounding box and improve the efficiency of the occlusion queries through the fragmentation of the bounding box because the bounding box may be created without tightly enclosing the object.

The communication unit 180 may produce the result of the occlusion queries. The communication unit 180 may transmit the result of the occlusion queries to the CPU asynchronously. Because the result of the occlusion queries is stored in the memory of the GPU 100, the result of the occlusion queries is necessary to be transmitted to the memory of the CPU to exclude the occluded objects from rendering after that.

As another example, the result of the occlusion queries may be performed synchronously in one frame or only for some of one or more objects in the frame. In one example embodiment of the present invention, the result of the occlusion queries may be transmitted from the GPU 100 to the CPU because it may be included within one image. Since the transmission commonly requires a processing time of one or two frames, before the GPU 100 processes the next frame, the CPU may acquire the result of the occlusion queries for the current frame. Accordingly, the communication unit 180 may allow the result of the occlusion queries of the one or more objects in the frame to be used immediately through one image.

Detailed Method for the Occlusion Query

FIG. 2 is a flowchart to perform the occlusion queries in accordance with one example embodiment of the present invention.

In the steps S210 to S270, the GPU 100 may remove occlusion in a frame and perform the occlusion queries to remove the occlusion.

First of all, a frame where a depth buffer has been already created is named a first frame. Besides, a frame where a depth buffer will be predicted by warping is called a second frame. In accordance with one example embodiment of the present invention, the first frame may be a frame which predates the second frame. So to speak, if the first frame is at a time t, the second frame may be at a time t+x where x may be an integer which is 1 or more. The first and the second frames may also be consecutive frames in time. A depth buffer of the first frame is named as a first depth buffer and a depth buffer of the second frame which is predicted by using the depth buffer of the first frame is named as a second depth buffer. For example, if the first frame is the current frame as a target to be processed now, the second frame may be the next frame to be created after the first frame.

(i) The depth buffer rendering unit 110 may predict the second depth buffer of the second frame by using the first depth buffer of the first frame at steps of S210 through S250. The depth buffer rendering unit 110 may conservatively predict the second depth buffer by using the motion vector buffer rendering unit 120, the motion mipmap construction unit 130, the motion buffer construction unit 140, the depth buffer warping unit 150, and the hole filling unit 160.

(i-1) To create the second depth buffer, the motion vector buffer rendering unit 120 may create a motion vector buffer of the first frame at a step of S210 where the first frame may be the current frame explained by referring to FIG. 1.

(i-2) Next, the motion mipmap construction unit 130 may generate a motion mipmap at a step of S220. The motion mipmap construction unit 130 may generate a motion mipmap of the first frame by using the motion vector buffer.

(i-3) Then, the motion buffer construction unit 140 may create N-buffers at a step of S230. The motion buffer construction unit 140 may create the N-buffers of the first frame by using the motion vector buffer.

(i-4) After that, the depth buffer warping unit 150 may predict the second depth buffer based on the warping of the first depth buffer at a step of S240. In other words, the predicted second depth buffer may be a depth buffer acquired from the warping of the first depth buffer.

As explained above by referring to FIG. 1, the motion vector buffer rendering unit 120 may acquire motion vectors on the screen space or the object space. The depth buffer warping unit 150 may perform the warping of the first depth buffer by using a motion in at least either on the screen space or on the object space of the first frame or the second frame. The depth buffer warping unit 150 may predict the second depth buffer by warping the first depth buffer with the motion mipmap and the N-buffers.

To improve the performance of the occlusion culling, the depth buffer warping unit 150 may warp the depth buffer of one or more objects seen in the first frame and the warped depth buffer may be used as occluder after that.

In accordance with one example embodiment of the present invention, the warping may be the backward warping and the motion vector buffer rendering unit 120 may perform the backward warping by using the motion mipmap and N-buffers.

(i-5) Next, the hole filling unit 160 may perform the hole filling for a hole generated in the second depth buffer after the warping at a step of S250. The hole filling unit 160 may fill the hole generated in the second depth buffer after the warping to the maximum depth.

(ii) The occlusion query unit 170 may perform the occlusion queries for the second frame by using the second depth buffer, i.e., the predicted second depth buffer, at a step of S260. In accordance with one example embodiment of the present invention, if the second depth buffer of the second frame to be drawn next is predicted by performing the warping of the first depth buffer of the first frame as the current frame, the occlusion query unit 170 may use the predicted second depth buffer of the second frame as an occluder without separately selecting the occluder. In other words, selecting an occluder in a conventional technology may be replaced with creating the depth buffer drawn in the second frame as the next frame. The occlusion query unit 170 may perform the occlusion queries by using the predicted second depth buffer as an occluder map.

As explained above, the second depth buffer may be predicted through the warping of the first depth buffer. In other words, when objects shown in the first frame as the current frame move to a visible location in the second frame as the next one, they may be optimal occluders. Accordingly, the occlusion query unit 170 may create optimal occluders without any separate process of selecting the occluders, and also may perform the occlusion test with respect to the second frame. Due the aforementioned function of the occlusion query unit 170, the additional load requested for the occlusion queries may be reduced, and the occlusion queries may be performed with high performance. In addition, the occlusion queries in accordance with one example embodiment of the present invention may be performed without classifying one or more objects in the second frame into occluders and occludees.

In accordance with one example embodiment of the present invention, the second frame may include one or more objects and the occlusion query unit 170 may process the occlusion queries for one or more objects in the second frame in parallel. The occlusion query unit 170 may perform the occlusion test for the one or more objects in the second frame for a single pass.

In accordance with one example embodiment of the present invention, the occlusion query unit 170 may use the N-buffers to structuralize the depth buffer hierarchically and perform the occlusion queries by using the N-buffers. The occlusion query unit 170 may process the occlusion queries with respect to the one or more objects in the second frame in parallel by using the hierarchical occlusion map, and the occlusion queries may be post-processed.

As the occlusion query unit 170 in accordance with one example embodiment of the present invention performs the occlusion test for the second frame in a post-processing approach, the process of culling and the process of rendering may be completely separated. Through the separation, the occlusion queries of the occlusion query unit 170 may be combined more easily with a rendering engine, integrated more easily with existing rendering software, and expanded more easily even to multi-GPU rendering, compared to other hardware-based occlusion queries.

Figure 3A:
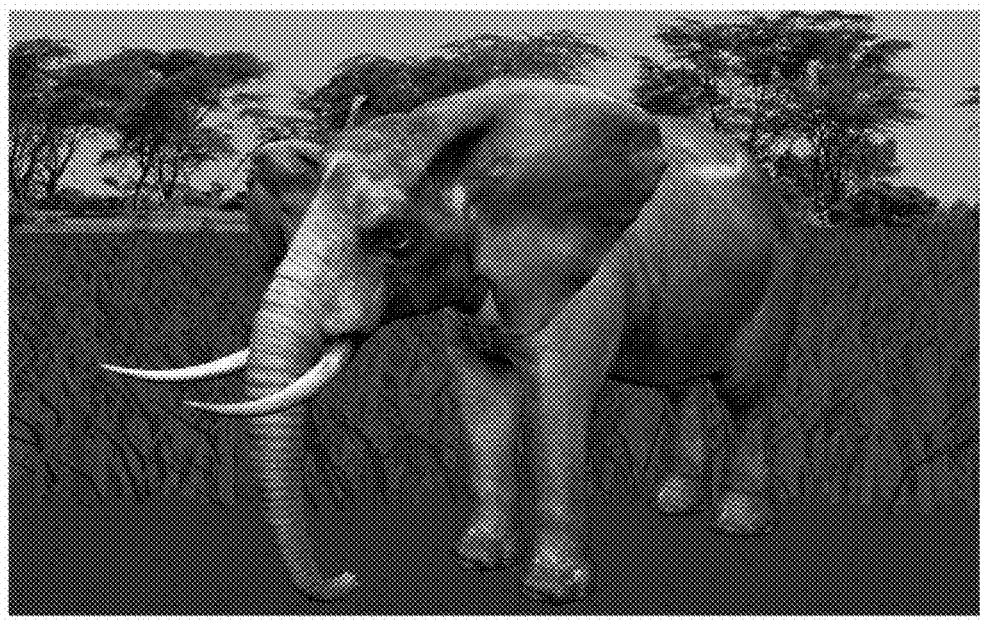
Figure 3B:

(iii) The communication unit 180 may transmit the result of the occlusion queries to the CPU at a step of S270. The communication unit 180 may transmit the result of the occlusion queries to the CPU immediately after the occlusion queries. As explained above, the second depth buffer of the second frame may be predicted by using the first depth buffer as the result of rendering of the first frame and motion buffer. So to speak, the result of the rendering of the second frame may be acquired in advance and the occlusion queries for the second queries may be performed in advance during the processing of the first frame or before the processing of the second frame (e.g., at the last of the first frame or the first of the second frame). The communication unit 180 may reduce additional load due to the transmission time from the GPU 100 to the CPU caused by transmitting the result of the occlusion queries already performed. FIGS. 3A to 3C illustrate an RGB image of the current frame, a depth buffer thereof, and a predicted depth buffer of the next frame in accordance with one example embodiment of the present invention.

FIG. 3A shows the RGB image of the current frame in accordance with one example embodiment of the present invention. The current frame may be a frame at a time t, and an RGB image may be an image $RGB_t$ at the time t.

FIG. 3B illustrates the depth buffer of the current frame in accordance with one example embodiment of the present invention. The depth buffer may be a depth buffer $Z_t$ at the time t.

FIG. 3C shows the predicted depth buffer of the next frame in accordance with one example embodiment of the present invention. The depth buffer may be a depth buffer $Z_{t+1}$ at a time t+1.

The GPU 100 may create, i.e., predict, $Z_{t+1}$ as a depth buffer of the next frame in advance by performing the warping of the depth buffer $Z_t$ during the processing of the current frame or before the processing of the next frame and may perform an image-based occlusion culling by using $Z_{t+1}$, the predicted depth buffer. The GPU 100 may not draw occluded objects during the processing of the next frame by using the result of the occlusion culling.

In FIG. 3C, parts with a shape similar to that in FIG. 3B are created by warping, and other parts indicated in white are those where holes are created. The holes were filled with 1, as the maximum depth.

In accordance with the present invention, while the performance and the accuracy of the occlusion culling are improved, it can be easily integrated practically with the existing hardware and software.

In accordance with the present invention, a configuration for classifying the objects into the occluders and the occludees is not required.

In accordance with the present invention, the occlusion queries for the next frame are acquired in advance during the processing of the current frame or before the processing of the next frame.

In accordance with the present invention, the load due to the transmission time caused by transmitting the result of the occlusion queries from the GPU to the CPU is reduced.

In accordance with the present invention, the occlusion queries are performed in parallel irrelevantly to the hierarchical structures of the objects, compared to a method for requiring hierarchical structures of objects such as CHC++, etc.

In accordance with the present invention, the occlusion queries may be integrated easily with the existing rendering engines and software and also easily with the structure of multi-GPU rendering by their post-processing structures of the occlusion queries.

In accordance with the present invention, load added by the warping of the depth buffer is not excessive because the depth buffer and the motion vector buffers required for the warping of the depth buffer are already available in G-buffer in the recent real-time rendering structure.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for performing occlusion queries, comprising steps of:
    (a) a graphics processing unit (GPU) using a first depth buffer of a first frame to thereby predict a second depth buffer of a second frame; and
    (b) the GPU performing occlusion queries for the second frame by using the predicted second depth buffer,
    wherein the first frame is a frame predating the second frame;
    wherein, at the step of (a), the GPU creates the predicted second depth buffer based on warping of the first depth buffer,
    wherein, at the step of (a), the warping is a backward warping and the GPU performs the backward warping by using a hierarchical data structure of the first frame.

2. The method of claim 1, further comprising the step of:
(c) transmitting a result of the occlusion queries to a CPU.

3. The method of claim 1, wherein, at the step of (b), the GPU performs the occlusion queries by using the predicted second depth buffer as an occluder map.

4. The method of claim 1, wherein, at the step of (b), the occlusion queries are performed without classifying one or more objects of the second frame into occluders and occludees.

5. The method of claim 1, wherein, at the step of (a), the GPU performs the warping of the first depth buffer by using a motion in at least either screen space or object space of the first frame or the second frame.

6. The method of claim 1, wherein, at the step of (a), the GPU fills a hole generated at the predicted second depth buffer after the warping to the maximum depth.

7. The method of claim 1, wherein the second frame includes one or more objects and, at the step of (b), the GPU processes the occlusion queries for the one or more objects in parallel.

8. One or more non-transitory computer-readable recording media having stored thereon a computer program that, when executed by one or more processors, causes the one or more processors to perform acts including:
(a) a graphics processing unit (GPU) using a first depth buffer of a first frame to thereby predict a second depth buffer of a second frame; and
(b) the GPU performing occlusion queries for the second frame by using the predicted second depth buffer,
wherein the first frame is a frame predating the second frame;
wherein, at the step of (a), the GPU creates the predicted second depth buffer based on warping of the first depth buffer,
wherein, at the step of (a), the warping is a backward warping and the GPU performs the backward warping by using a hierarchical data structure of the first frame.

9. A GPU, comprising:
a depth buffer rendering unit for using a first depth buffer of a first frame to thereby predict a second buffer of a second frame; and
an occlusion query unit for performing occlusion queries for the second frame by using the predicted second depth buffer;
a depth buffer warping unit for creating the predicted second depth buffer based on warping of the first depth buffer; and
wherein the warping is a backward warping, and the depth buffer warping unit performs the backward warping by using a hierarchical data structure of the first frame;
wherein the first frame is a frame predating the second frame in time.

10. The GPU of claim 9, further comprising: a communication unit for transmitting a result of the occlusion queries to a CPU.

11. The GPU of claim 9, wherein the occlusion query unit performs the occlusion queries by using the predicted second depth buffer as an occluder map.

12. The GPU of claim 9, wherein the occlusion queries are performed without classifying one or more objects of the second frame into occluders and occludees.

13. The GPU of claim 9, wherein the depth buffer warping unit performs the warping of the first depth buffer by using a motion in at least either on screen space or on object space of the first frame of the second frame.

14. The GPU of claim 9, further comprising: a hole filling unit for filling a hole generated at the predicted second depth buffer after the warping to the maximum depth.

15. The GPU of claim 9, wherein the second frame includes one or more objects, and the occlusion query unit processes the occlusion queries for the one or more objects in parallel.

* * * * *